(12) United States Patent
Burnett et al.

(10) Patent No.: US 6,648,270 B1
(45) Date of Patent: Nov. 18, 2003

(54) VEHICLE

(75) Inventors: Edward L. Burnett, Ventura, CA (US); John W. Vinson, Thousand Oaks, CA (US); Brian Quayle, Lancaster, CA (US); Michael C. Carter, Palmdale, CA (US); Kenneth Gousman, Palmdale, CA (US); Scott Wan Weelden, Lancaster, CA (US); Steven P. Ericson, Lancaster, CA (US); Stephen G. Justice, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/157,705

(22) Filed: Aug. 7, 2002

(51) Int. Cl.⁷ ............................................. B64C 29/00
(52) U.S. Cl. .................. 244/23 A; 244/23 D; 244/12.4; 180/117; 180/120; 114/67 A; 114/289; 114/290
(58) Field of Search ................. 180/117, 116, 180/120, 123; 244/23 A, 23 B, 23 D, 12.4, 12.5; 114/67 A, 272, 283, 290, 289

(56) References Cited

U.S. PATENT DOCUMENTS

| | | | | |
|---|---|---|---|---|
| 3,038,683 A | * | 6/1962 | Rowe | 244/12.4 |
| 3,602,460 A | * | 8/1971 | Whittley et al. | 244/12.4 |
| 4,712,630 A | | 12/1987 | Blum | 180/117 |
| 4,724,786 A | * | 2/1988 | Guezou et al. | 114/67 A |
| 5,242,132 A | | 9/1993 | Wukowitz | 244/106 |
| 5,275,356 A | * | 1/1994 | Bollinger et al. | 244/12.3 |
| 5,915,650 A | | 6/1999 | Petrovich | 244/46 |
| 5,934,215 A | * | 8/1999 | Burg | 114/67 A |

* cited by examiner

Primary Examiner—J. Woodrow Eldred

(57) ABSTRACT

A vehicle is disclosed having a hull with a longitudinal, vertical and lateral axis, the hull further having front end and rear ends and first and second sides. A turbofan engine mounted in said hull, said engine having an exhaust duct. First and second front exhaust nozzles are mounted on the first and second sides of the front end of the hull. First and second rear exhaust nozzles are coupled to the first and second sides of said hull at said rear. All of the exhaust nozzles are rotatable from a vertically downward position to at least a partially horizontal direction and incorporating shudders to adjust the flow rate of exhaust gas from said turbofan engine therethrough. A duct system for coupling the exhaust duct of the turbofan engine to all of the nozzles.

15 Claims, 6 Drawing Sheets

VEHICLE

BACKGROUND OF THE INVENTION

1. Field of the Invention

The invention relates to the field of transportation vehicles and, in particular, to a vehicle that is capable of travel on the water, vertical flight and hovercraft type operation.

2. Description of Related Art

Many aircraft have been designed to land and takeoff from both water and land using a fuselage having a boat shaped waterproof hull or pontoons mounted on struts extending from the fuselage. However these aircraft are not designed for traveling significant distances on the water. Hovercraft are designed to travel a few inches above the water. They are generally limited to flat terrain when over land. Flight, however, is not possible. They operate by pumping air into inflatable bags under the vehicle, which thereafter exits forming a support cushion. Ducted propellers or fans are used for horizontal movement. Some helicopters are designed to land and takeoff from water.

In the past, there have been numerous vehicles produced providing vertical takeoff and landing using vertically mounted ducted fans or propellers. Some of these vehicles were designed to land and takeoff from both land and water. The smallest design being nothing more than a ducted fan platform with the pilot standing there above. However, most designs used multiple ducted fans, thus requiring a larger planform.

Thus it is a primary object of the invention to provide a vertical takeoff and landing vehicle that is designed to travel long distances on the water.

It is another primary object of the invention to provide a vertical takeoff and landing vehicle having a small size that is designed to travel long distances on the water.

It is a further object of the invention to provide a vertical takeoff and landing vehicle that is small in size and is designed to travel long distances on the water by using a turbofan engine exhaust ducted through a plurality of rotatable nozzles.

SUMMARY OF THE INVENTION

The invention is a vehicle having the capability to travel on water, vertically takeoff and land, and travel in the air at moderate altitudes. In detail, the vehicle includes a hull having a longitudinal, vertical and lateral axis, the hull further having front end and rear ends, first and second sides, and a passenger compartment. A turbofan engine is mounted in the hull. A center plenum chamber is mounted in the hull having a center portion coupled to the exhaust duct of the engine and first and second ends extending latterly to the first and second sides of the hull. First and second side plenum chambers having front and rear ends extend along the first and second sides of the hull and are coupled to the first and second ends, respectively, of the center plenum. First and second front exhaust nozzles are coupled to the front ends of the first and second side plenum chambers and first and second rear exhaust nozzles are coupled to the rear ends of the first and second side plenum chambers. All of these exhaust nozzles are rotatable from a vertically downward position to at least a partially horizontal direction and incorporating shudders to adjust the flow rate of exhaust gas from the turbofan engine therethrough.

In one embodiment, the hull is a trimaran hull with a central hull section and first and second side pontoons or hull sections. The turbofan engine in the central hull section with the inlet facing toward the front end of the hull and the exhaust duct facing to the end. The first and second side plenums are mounted in the first and second side hull sections. The exhaust duct is coupled to the center of the center plenum chamber and the rear ends of the first and second side plenum chambers are coupled to the first and second ends of the center plenum chamber. The first and second front exhaust nozzles face inward toward the longitudinal axis of the hull and the first and second rear nozzles face outward away from the longitudinal axis. An opening in the center hull section is in communication with inlet of the turbofan engine and a door mounted on center section of the hull is used to cover the opening, when the engine is off.

In another embodiment, the hull is also a trimaran with the turbofan engine mounted with the inlet facing toward the rear end of the center section of the hull and the exhaust duct facing to the front end and coupled to the center of the center plenum chamber. The front ends of the first and second side plenum chambers are coupled to first and second ends of the center plenum chamber. The inlet of the turbofan engine is connected to a passageway in the center section of the hull extending initially along the longitudinal axis of the hull and curving upward exiting the hull in the direction of the vertical axis. In this embodiment, the exhaust nozzles all are mounted on the external sides of the side hulls facing away from the longitudinal axis thereof.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
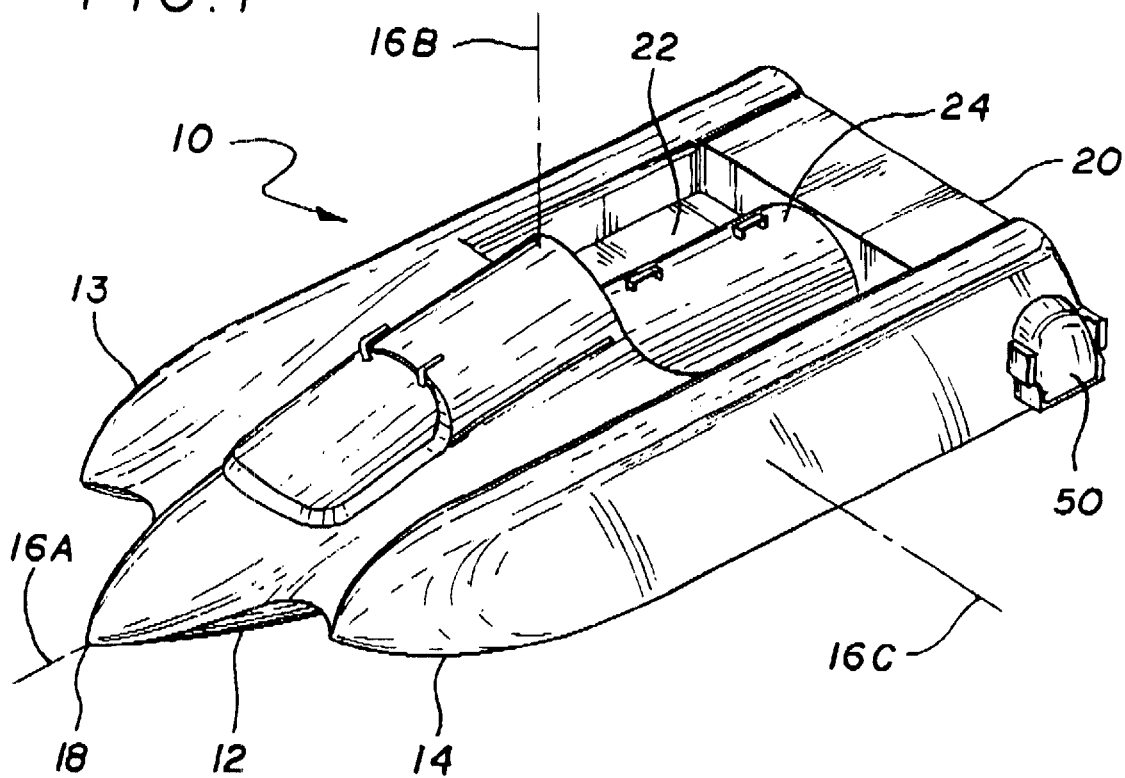
FIG. 1 is a perspective view of front and top of the vehicle.
Figure 2:
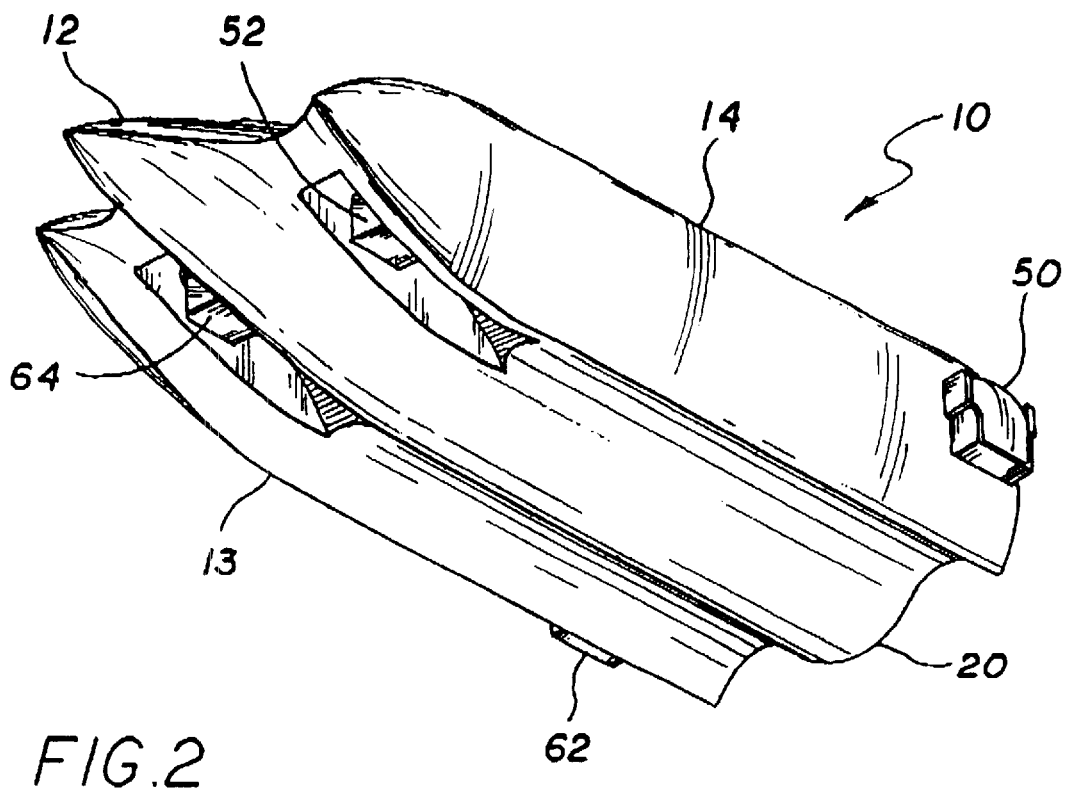
FIG. 2 is a perspective view of the front and bottom of the vehicle.
Figure 3:
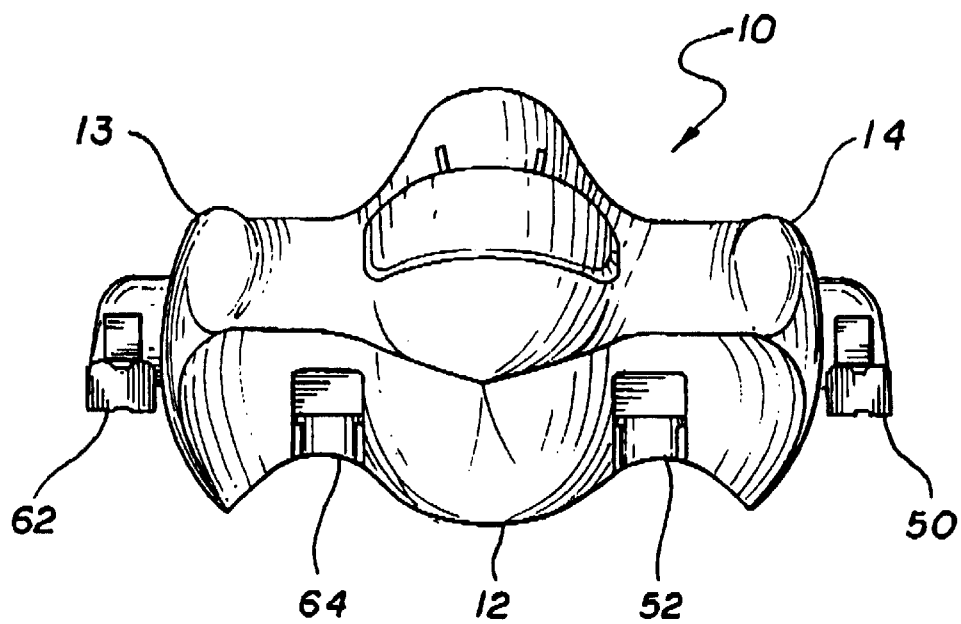
FIG. 3 is a front view of the vehicle.
Figure 5:
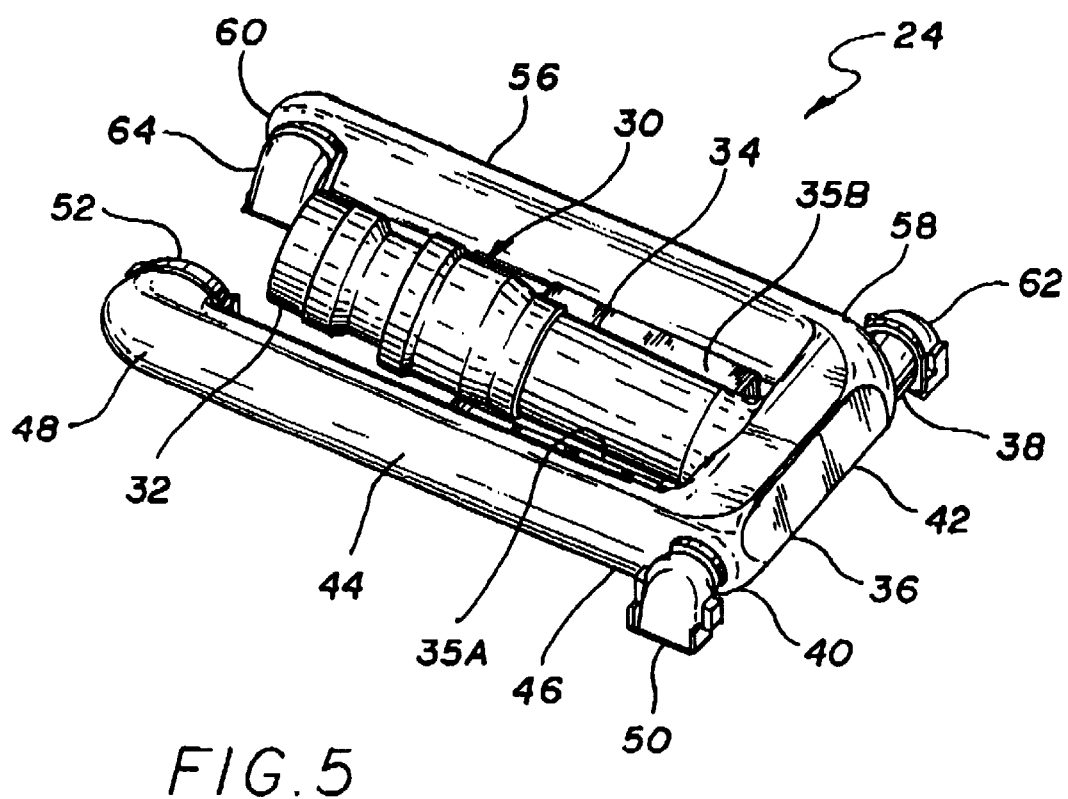
FIG. 5 is a perspective view of the propulsion system for the vehicle.
Figure 4:
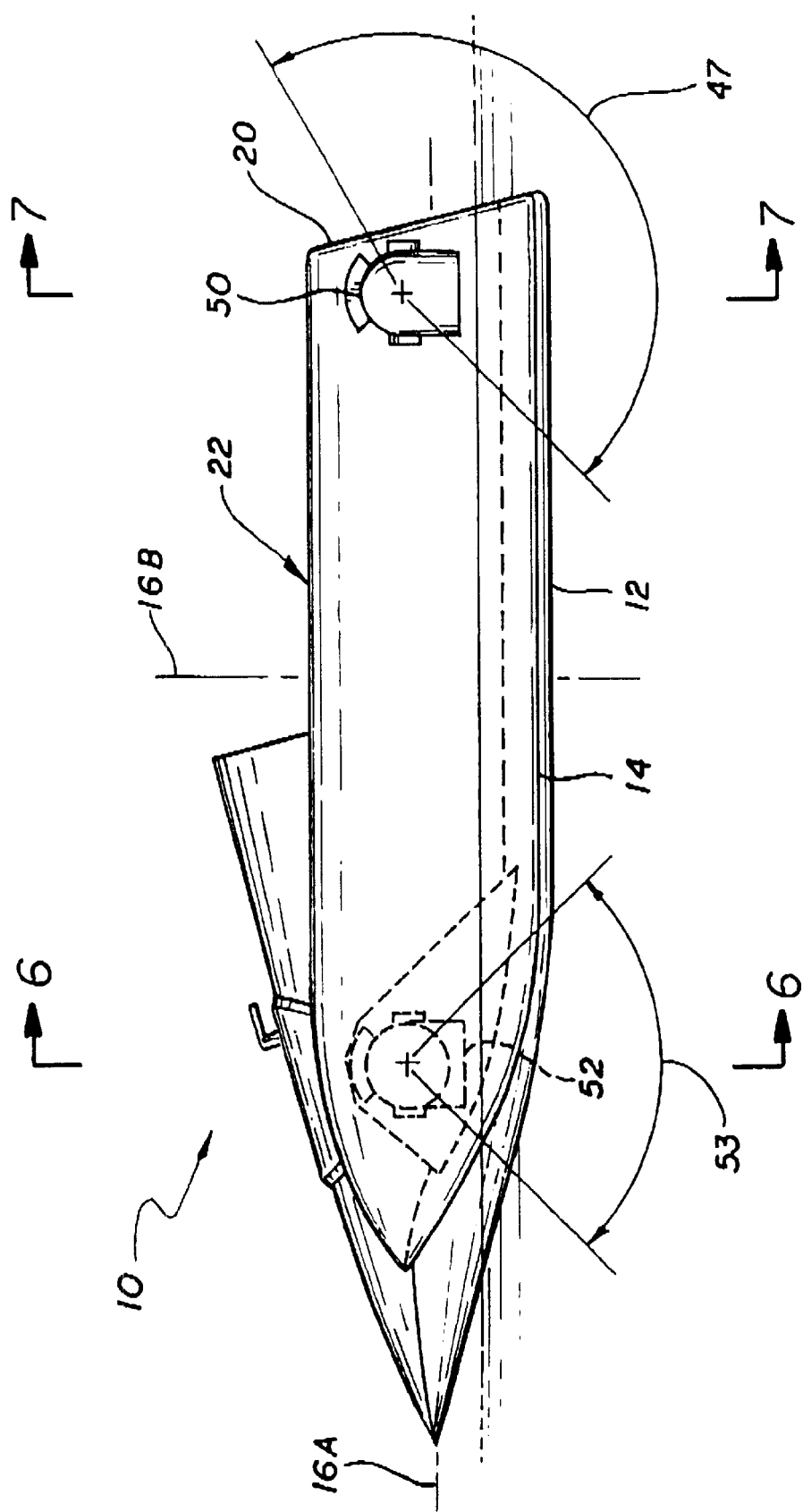
FIG. 4 is a side view of the vehicle.

Referring to FIGS. 1–4, the vehicle, indicated by numeral 10, is a trimaran having three hulls: center hull 12, right side pontoon or hull 13 and left side pontoon or hull 14. The vehicle further includes a longitudinal axis 16A, vertical axis 16B, lateral axis 16C, front end 18, rear end 20, with a passenger compartment 22. The passenger compartment 22 is optional, for some versions may be remotely controlled. A propulsion system 24 is mounted within the hulls 12, 13, and 14.

Still referring to FIGS. 1–4 and additionally to FIGS. 5–8, the propulsion system 24 includes a turbofan engine 30 aligned with the longitudinal axis 16A and having an inlet 32 facing the front end 18 and an exhaust diffuser or duct 34 facing the rear end 20. In this embodiment the inlet 32 of the engine 30 is facing the front end 18 of the vehicle. Fuel tanks 35A and 35B are mounted on either side of the engine 30. A center plenum 36 having right and left ends 38 and 40, respectively, is mounted in the rear of the hulls 12, 13 and 14 and is aligned with the lateral axis 16C. The center plenum 36 is coupled at its middle 42 to the duct 34. A left side plenum 44 is mounted in the left hull 14 and is coupled by a rear end 46 to the end 40 of the center plenum 36 and runs forward in the left side hull and terminates at its front end 48 near the front end 18 of vehicle 10. An outward facing rear rotatable nozzle 50 is mounted at the rear end 46 and is rotatable through an angle, indicated by numeral 47, of 45 degrees clockwise from the vertical axis 16B to 120 degrees counter clockwise therefrom. An inward facing rotatable nozzle 52 is mounted at the front end 48 and is rotatable through an angle, indicated by numeral 53, of 45 degrees clockwise and counter clockwise from the vertical axis 16B.

A right side plenum 56 is mounted in the right side hull 13 and is coupled by a rear end 58 to the end 38 of the center plenum 36 and runs forward in the right side hull and terminates at its front end 60 near the front end 18 of vehicle 10. An outward facing rear rotatable nozzle 62 is mounted at the rear end 58 and is also rotatable through the angle 47. An inward facing rotatable nozzle 64 is mounted at the front end 60 and is rotatable through the angle 53.

Figure 6:
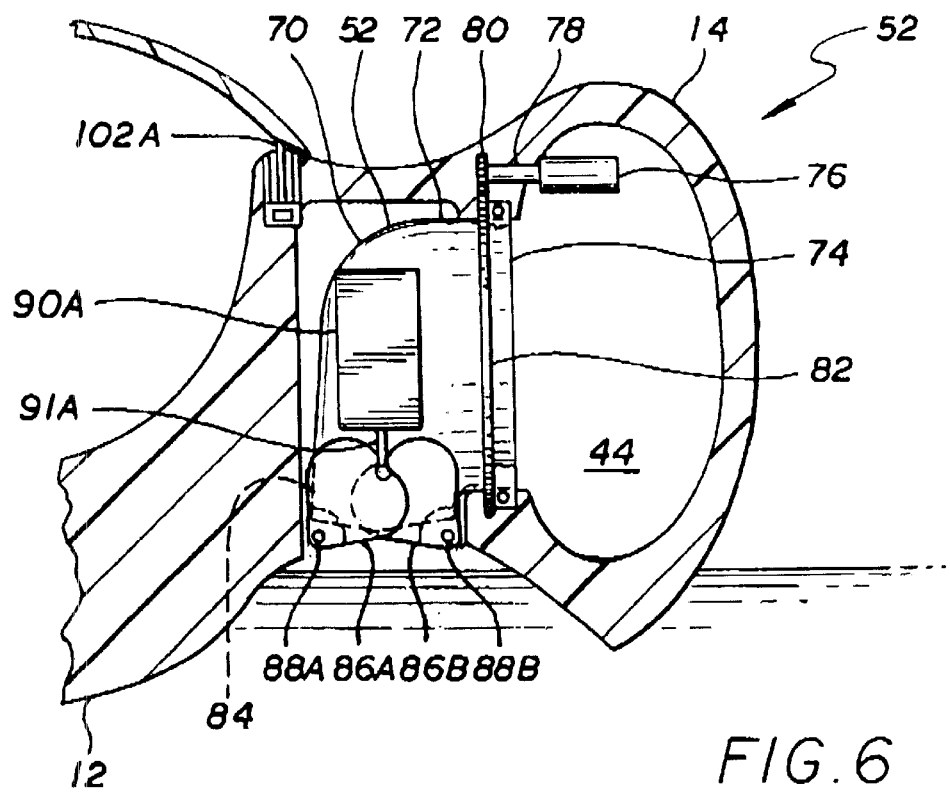
FIG. 6 is a partial cross-sectional view of FIG. 4 taken along the line 6—6 illustrating a front nozzle in the closed position.
Figure 7:
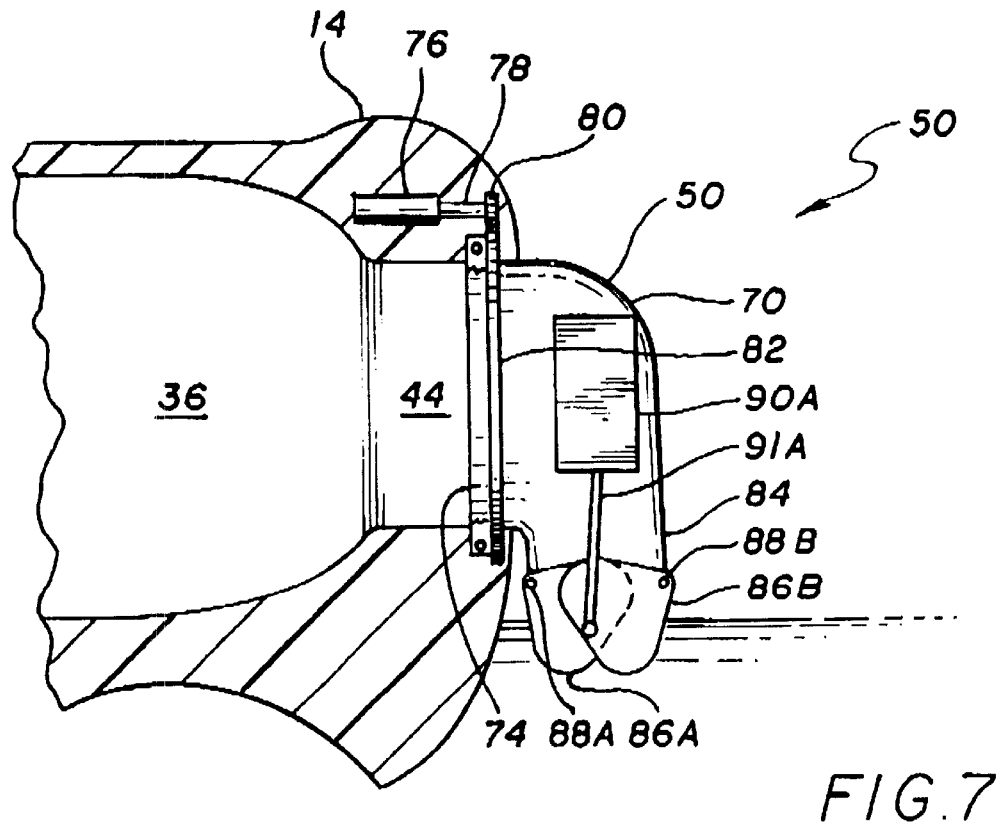
FIG. 7 is a partial cross-sectional view of FIG. 4 taken along the line 7—7 illustrating a rear nozzle in the open position.
Figure 8:
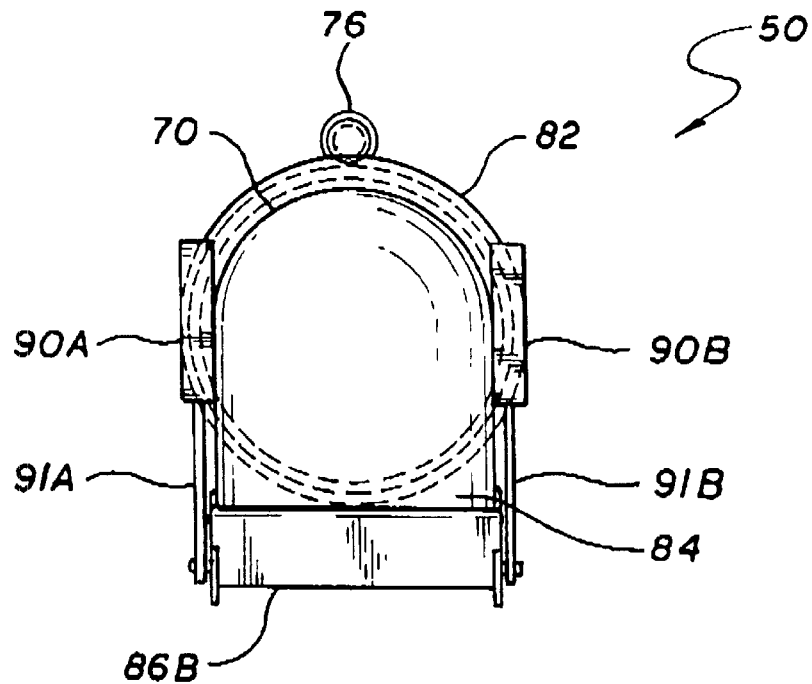
FIG. 8 is a side view of the nozzle assembly shown in FIG. 7.

All the nozzles are essentially identical, thus a detailed description will only be provided for nozzle 50 and 52. Referring to FIGS. 6–8, nozzle 50 includes a ninety degree elbow 70 rotatably mounted by its end 72 to end 46 of the left side plenum 44 by means of bearing assembly 74. A motor 76, which may be electric or hydraulic, includes an output shaft 78 with a pinion gear 80 that is in engagement with a ring gear 82 mounted to end 72 of the elbow 70. Thus actuation of the motor 76 will cause the elbow 70 to rotate. The opposite end 84 of the elbow 70 includes a pair of flaps or shudders 86A and 86B pivotally mounted thereto by pins 88A and 88B, respectively. The shudders 86A and 86B are movable from the closed position shown in FIG. 5 to the open position shown in FIG. 6. Actuator assemblies 90A and 90B mounted to the sides of the elbow 70 are coupled to the shudders 86A and 86B, respectively, by means of shafts 91A and 91B and allow modulation of the position thereof.

Thus the nozzles 50, 52, 62 and 64 can individually or rotated in unison and the shudders 86A and 86B of each nozzle can also be simultaneously modulated. Thus vertical takeoff and landings can be accomplished as well as roll, pitch and yaw maneuvers. Travel on the water can be accomplished by closing the shudders 86A and 86B on the nozzles 52 and 64 and rotating the nozzles 50 and 62 so that they are aligned with the longitudinal axis 16A. For vertical flight, all the nozzles 50, 52, 62 and 64 are rotated so that they are aligned with the vertical axis 16B. For horizontal flight the nozzles 52 and 64 remain aligned with the vertical axis 16B, while the nozzles 50 and 62 are rotated counter-clockwise from the vertical axis 16B to 15 degrees therefrom. The shudders 86A and 86B of all the nozzles are modulated to insure that the vehicle remains horizontal.

Figure 9:
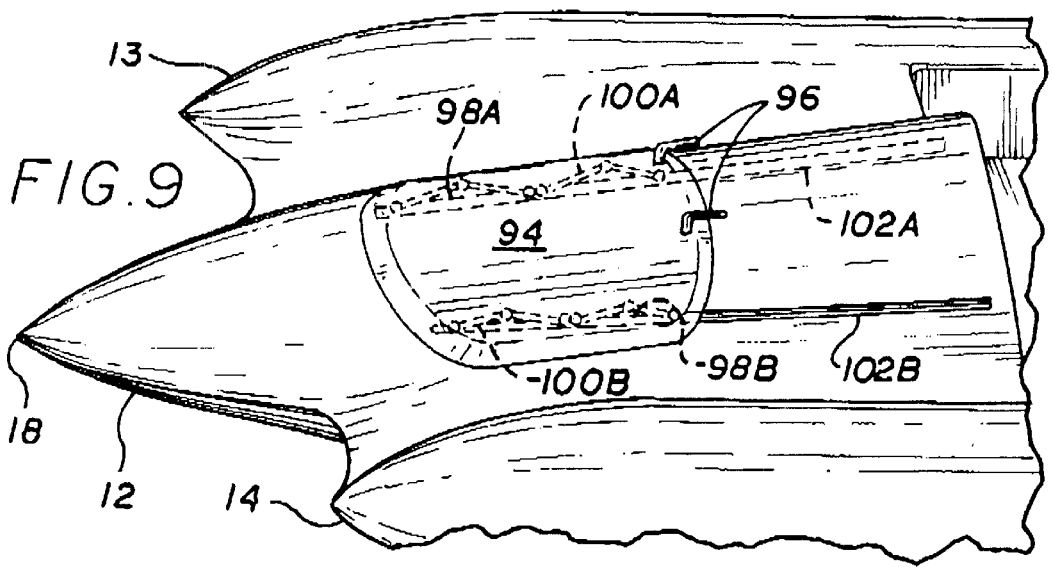
FIG. 9 is a partial perspective of the front of the vehicle illustrating the inlet to the turbojet engine with inlet door closed.
Figure 10:
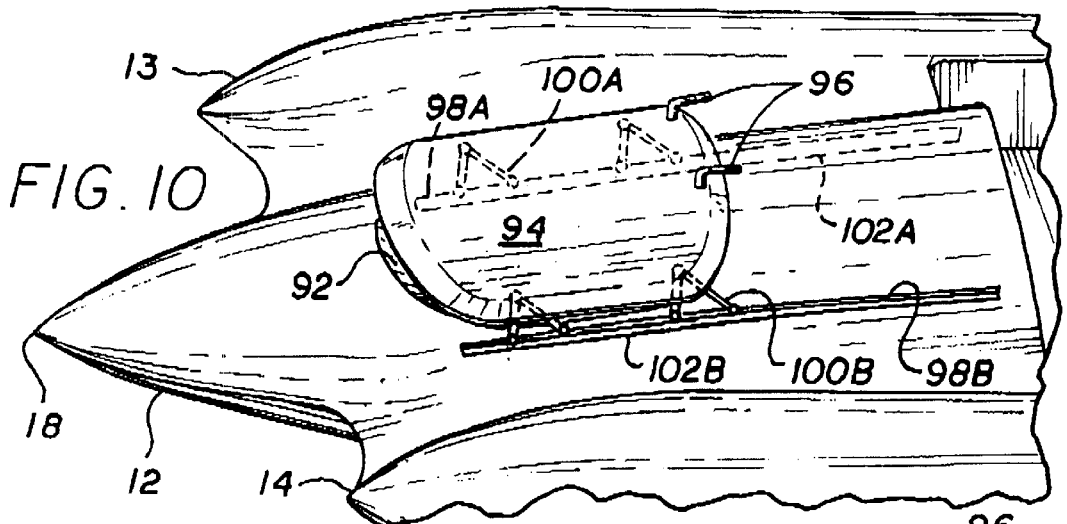
FIG. 10 is a view similar to FIG. 9 with the door open.
Figure 11:
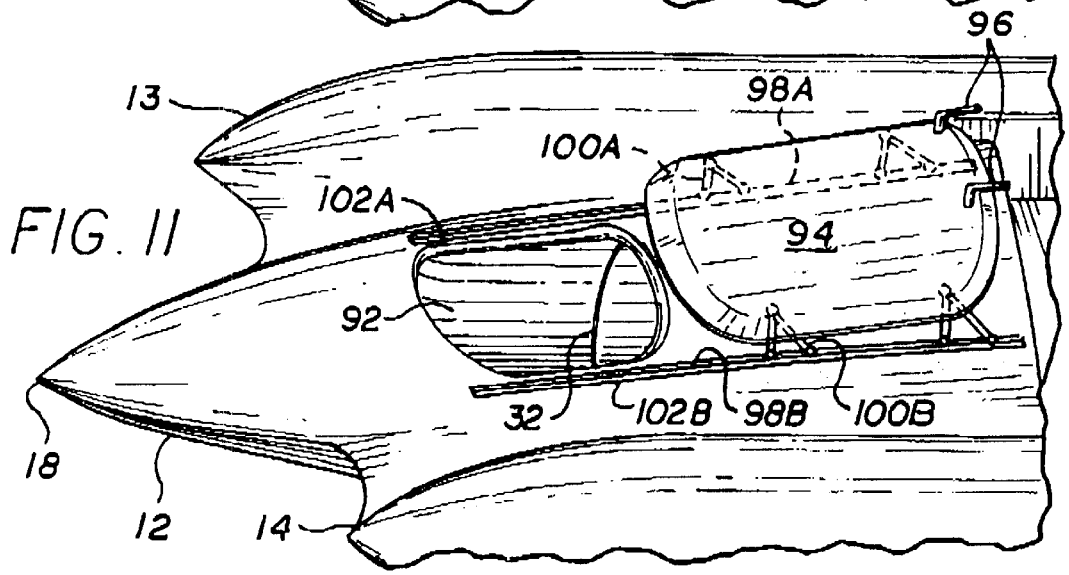
FIG. 11 is a view similar to FIG. 9 with door open and retracted.

Referring now to FIGS. 9–11, the inlet 32 of the engine 30 is coupled to an inlet duct 92 in the center hull 12. As illustrated a manually operated door 94 having handles 96 covers the duct 92. The door is mounted to slides 98A and 98b by means of four bar linkages 100A and 100B. The slides 98A and 98B are slidably mounted on rails 102A and 102B. The door 94 is shown closed in FIG. 8 and partially opened in FIG. 9, the position used when traveling on water. Partial opening is simply accomplished by pulling up on the handles 96. For airborne flight, the door 94 is moved to the position shown in FIG. 10. This is accomplished by further pulling on a handle 96, which moves the slides 98A and 98b back over the rails 102A and 102B. While a manual system is shown, it is possible to power the door to the positions indicated in FIGS. 9–11

Figure 12:
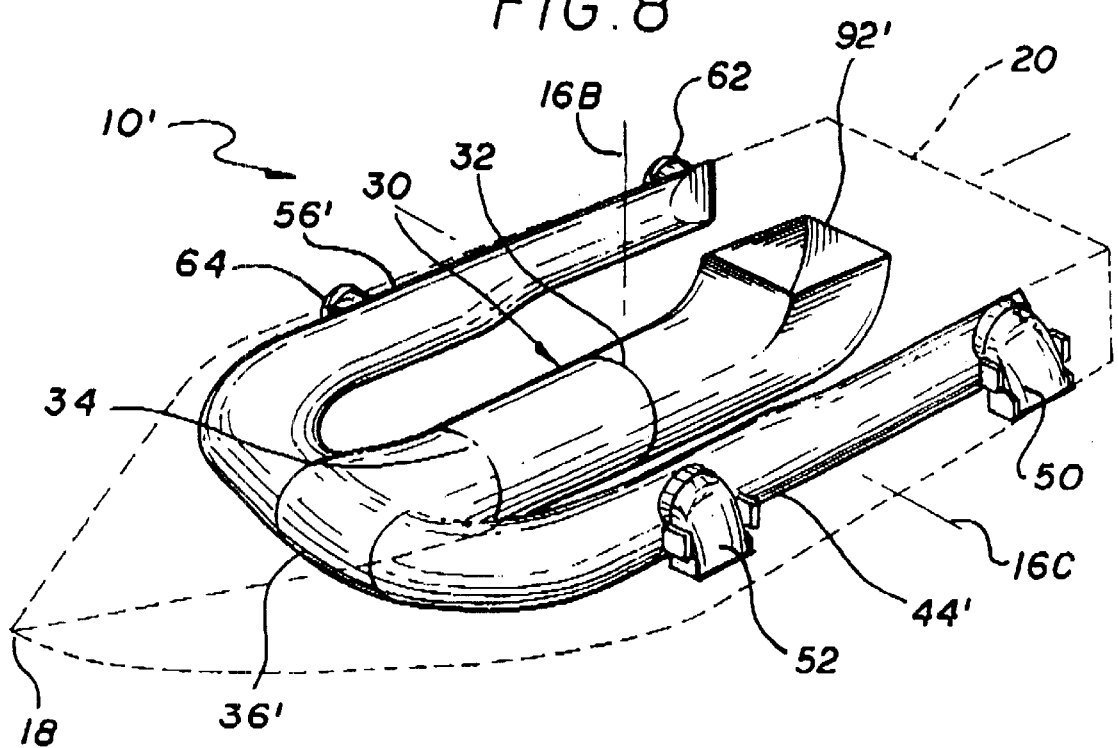
FIG. 12 is a perspective view of a second embodiment of the vehicle.

An alternate embodiment of the vehicle is illustrated in FIG. 12. In this version of the vehicle, indicated by numeral 10', the same trimaran concept is used except that the engine 30 is reversed and the central plenum 36' is in the front of the vehicle 10 coupled to exhaust duct 34. The right and left plenums 56' and 44' connect to the central plenum 36' and run toward the rear end 20. In addition, all the nozzles 50, 52, 62 and 64 are all facing away from the longitudinal axis 16A. The inlet duct 92' extends from the inlet 32 of the engine 30 rearward and curves upward exiting upward from center hull 12.

The above-described vehicle can be designed to carry up to three individuals in an open passenger compartment as illustrated. A small 1100-pound vehicle, with a 700-pound payload and a three thousand pound thrust engine could reach an altitude of approximately 10,000 feet and travel around 60 knots. However, the vehicle could be made much larger, with an appropriately larger engine. The advantages are obvious. The vehicle could be launched from a ship, travel across a significant body of water, takeoff and fly over land to ground target. The crew could carry out its mission, of attacking the target or just reconnoiter. Numerous other missions are obviously possible.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.
What is claimed is:
1. A vehicle comprising;
a hull having a longitudinal, vertical and lateral axis, said hull further having front end and rear ends and first and second sides;
a turbofan engine mounted in said hull, said engine having an exhaust duct;
a center plenum chamber mounted in said hull having a center portion coupled to said exhaust duct and first and second ends extending latterly to said first and second sides of said hull;
first and second side plenum chambers having front and rear extending along the first and second sides, said first and second side plenum chambers coupled to said first and second ends, respectively, of said center plenum; and first and second front exhaust nozzles coupled to said front ends of said first and second side plenum chambers and first and second rear exhaust nozzles coupled to said rear ends of said first and second side plenum chambers; all of said exhaust nozzles rotatable from a vertically downward position to at least a partially horizontal direction and incorporating means to adjust the flow rate of exhaust gas from said turbofan engine therethrough.

2. The vehicle as set forth in claim 1 further comprising a payload compartment mounted in said hull.

3. The vehicle as set forth in claim 2 further comprising:

said turbofan engine mounted with said inlet facing toward said front end of said hull and said exhaust duct facing to said end of said hull;

said exhaust duct coupled to the center of said center plenum chamber; and said rear ends of said first and second side plenum chambers coupled to said first and second ends of said center plenum chamber.

4. The vehicle as set forth in claim 3 wherein:

said hull is a trimaran hull with a central hull section and first and second side hull sections;

said first and second side plenums mounted in said first and second side hull sections; and said first and second front exhaust nozzles facing toward said longitudinal axis of said hull and said first and second rear nozzles facing away from said longitudinal axis.

5. The vehicle as set forth in claim 4 wherein said hull includes:

a opening in communication with said inlet of said turbofan engine; and a door mounted on said hull for covering said opening.

6. The vehicle as set froth in claim 2 further comprising:

said turbofan engine mounted with said inlet facing toward said rear end of end of said hull and said exhaust duct facing to said front end of said hull;

said exhaust duct coupled to the center of said center plenum chamber; and said front ends of said first and second side plenum chambers coupled to said first and second ends of said center plenum chamber.

7. The vehicle as set forth in claim 6 wherein:

said turbofan engine is aligned with the longitudinal axis of said hull; and said hull having a passageway extending initially along the longitudinal axis of said hull and curving up exiting said hull in the direction of said vertical axis of said hull.

8. A vehicle comprising;

a hull having a longitudinal, vertical and lateral axis, said hull further having front end and rear ends and first and second sides;

a turbofan engine mounted in said hull, said engine having an exhaust duct;

first and second front exhaust nozzles mounted on said first and second sides of said front end of said hull and first and second rear exhaust nozzles coupled to said first and second sides of said hull at said rear, all of said exhaust nozzles rotatable from a vertically downward position to at least a partially horizontal direction and incorporating means to adjust the flow rate of exhaust gas from said turbofan engine therethrough; and means coupling said exhaust duct of said turbofan engine to all of said nozzles.

9. The vehicle as set forth in claim 8 wherein said means comprises:

a center plenum chamber mounted in said hull having a center portion coupled to said exhaust duct and first and second ends extending latterly to said first and second sides of said hull;

first and second side plenum chambers having front and rear extending along the first and second sides, said first and second side plenum chambers coupled to said first and second ends, respectively, of said center plenum; said front ends of said first and second side plenum chambers coupled to said first and second front nozzles and said rear ends of said first and second side plenum chambers coupled to said first and second rear nozzles.

10. The vehicle as set forth in claim 9 further comprising a payload compartment mounted in said hull.

11. The vehicle as set forth in claim 10 further comprising:

said turbofan engine mounted with said inlet facing toward said front end of said hull and said exhaust duct facing to said end of said hull;

said exhaust duct coupled to the center of said center plenum chamber; and said rear ends of said first and second side plenum chambers coupled to said first and second ends of said center plenum chamber.

12. The vehicle as set forth in claim 11 wherein:

said hull is a trimaran hull with a central hull section and first and second side hull sections;

said first and second side plenums mounted in said first and second side hull sections; and said first and second front exhaust nozzles facing toward said longitudinal axis of said hull and said first and second rear nozzles facing away from said longitudinal axis.

13. The vehicle as set forth in claim 12 wherein said hull includes:

a opening in communication with said inlet of said turbofan engine; and a door mounted on said hull for covering said opening.

14. The vehicle as set froth in claim 13 further comprising:

said turbofan engine mounted with said inlet facing toward said rear end of end of said hull and said exhaust duct facing to said front end of said hull;

said exhaust duct coupled to the center of said center plenum chamber; and said front ends of said first and second side plenum chambers coupled to said first and second ends of said center plenum chamber.

15. The vehicle as set forth in claim 14 wherein:

said turbofan engine is aligned with the longitudinal axis of said hull; and said hull having a passageway extending initially along the longitudinal axis of said hull and curving up exiting said hull in the direction of said vertical axis of said hull.

* * * * *